INVENTORS
BYRON L. ALLISON
PAUL C. BAUER
ATTORNEY

INVENTORS
BYRON L. ALLISON
PAUL C. BAUER

United States Patent Office 2,857,766
Patented Oct. 28, 1958

2,857,766

RATE OF TURN INDICATOR

Byron L. Allison and Paul C. Bauer, Davenport, Iowa, assignors to Bendix Aviation Corporation, Davenport, Iowa, a corporation of Delaware Application November 15, 1954, Serial No. 468,624

11 Claims. (Cl. 74—5.4)

The invention relates to gyroscopes and more particularly to gyroscopes adapted to indicate rate of angular motion, such as rate of turn of the craft on which the gyroscope is mounted.

An angular rate gyroscope has two degrees of freedom and includes a rotor support rotatably supported in a frame for oscillation about an axis at right angles to the spin axis of the rotor. When the craft on which the gyroscope is mounted executes a turn, the gyroscope precesses in one direction or the other from its neutral position, as determined by the direction of the turn, and in some instances, coil springs are used to oppose precession of the gyroscope from its neutral position, but such springs are sensitive to friction and do not return the gyroscope to its neutral position. Also, such springs usually are non-linear.

One object of the present invention is to provide a novel spring means for opposing precession of the gyroscope from neutral position.

Another object is to provide novel spring means which exerts a substantially linear force on the gyroscope in opposing precession and which is cheap and simple to construct and positive in its action in returning the gyroscope to neutral position.

The invention contemplates an angular rate gyroscope having a rotor rotatable in a support member mounted for oscillation in a frame member and means yieldingly opposing precession of the support member in either direction from its neutral position comprising a rod-like element connected to the members. The rod-like element may be fixedly attached to one of the members and slidably attached to the other of the members.

The foregoing and other objects and advantages of the invention will appear more fully hereinafter from a consideration of the detailed description which follows, taken in conjunction with the accompanying drawings wherein two embodiments of the invention are illustrated. It is to be expressly understood, however, that the drawings are for the purposes of illustration and description only, and are not to be construed as defining the limits of the invention.

Figure 1:
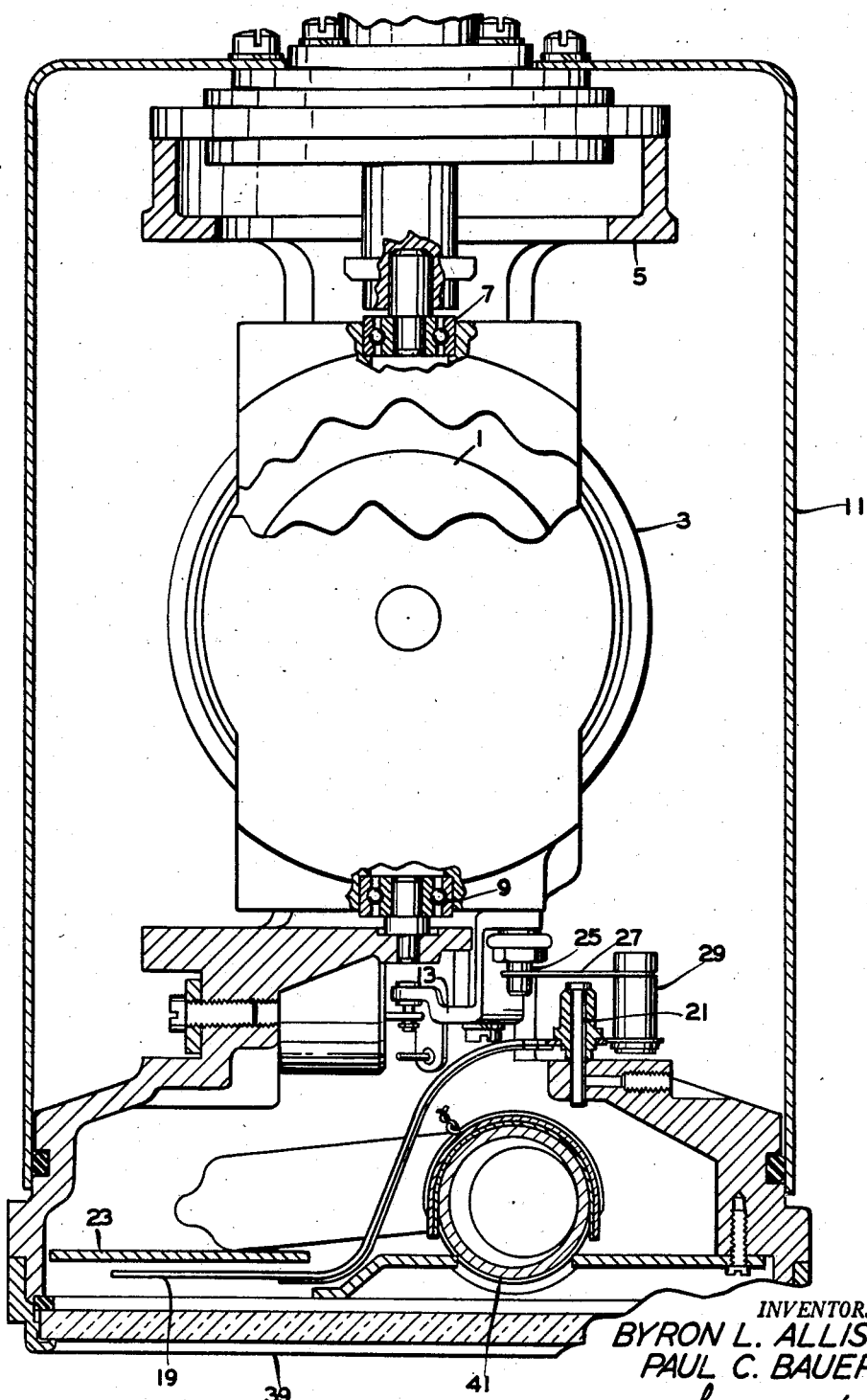
Fig. 1 is a horizontal section of an angular rate indicator constructed according to the invention and taken approximately on the line 1—1 of Fig. 2.

The novel angular rate gyroscope of the invention is shown embodied in an angular rate indicator and comprises a rotor 1 rotatably supported in a rotor support or casing 3, mounted for oscillation in a frame 5 by bearings 7, 9. A cover 11 is secured to frame 5. A bracket 13 is secured to casing 3 and is pivotally connected to an arm 15 attached to the plunger of dash pot 17.

A pointer 19 is pivoted to frame 5 by a pivot 21 and is drivably connected to rotor casing 3 to indicate angular rate of turn on a dial 23. A pin 25 on bracket 13 is received between the ends of a forked member 27 secured to a pin 29 mounted on pointer 19.

A rod-like spring element 31 is secured at one end to bracket 13 and extends through the axis of rotation of rotor casing 3 and the other end of element 31 is slidably received in a jewel bearing 33 mounted in a member 35 threaded to frame 5. This provides for adjusting the bearing lengthwise of element 31 to vary the effective length of element 31 and thus vary the sensitivity of the gyroscope. A lock nut 37 prevents rotation of member 35 relative to frame 5 after adjustment.

Upon precession of the gyroscope, rotor casing 3 pivots in frame 5 and moves pointer 19 over associated dial 23 and such movement is opposed by dash pot 17 and spring element 31. Spring element 31 flexes in one direction or the other, as determined by the direction of angular movement of rotor casing 3 from neutral position, and as it flexes, it slides in bearing 33. Element 31 exerts an angular force on rotor casing 3 opposing precession of the gyroscope and returns the casing to neutral position when the precessing forces are withdrawn.

The housing may be provided with a suitable cover glass 39 at its forward end for viewing pointer 19 and dial 23 and the instrument may also include an inclinometer assembly 41.

Figure 2:
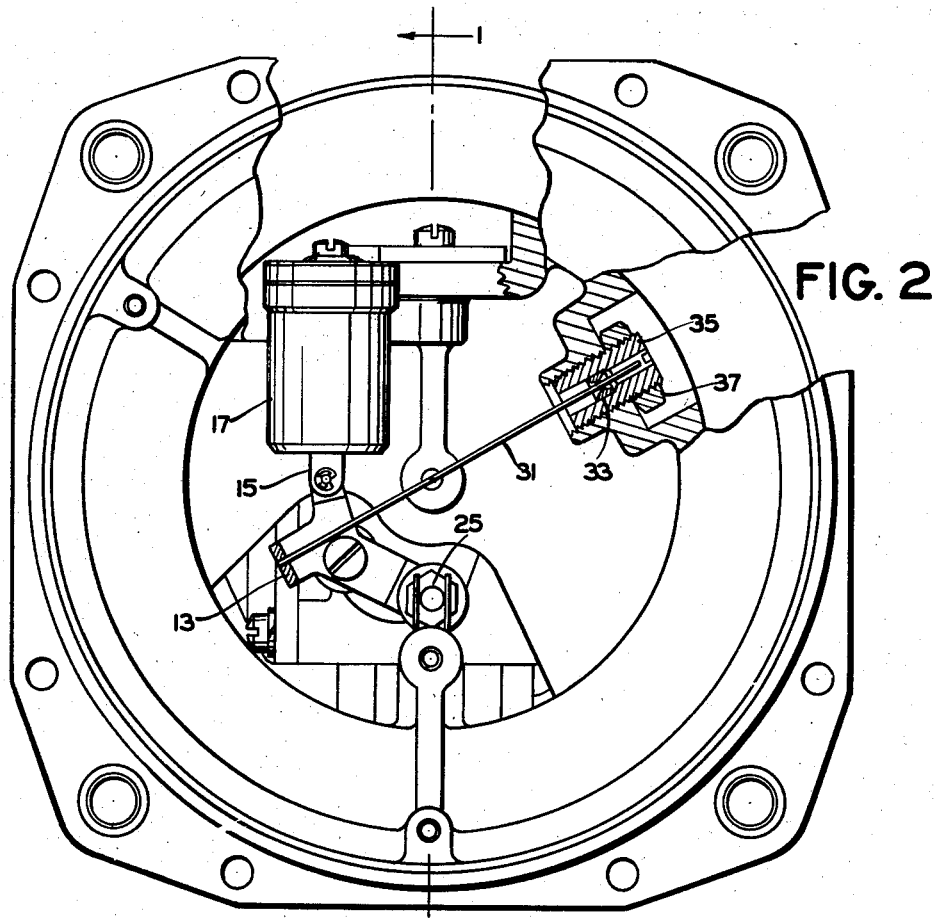
Fig. 2 is in part a front view and in part a vertical section with portions of the indicator removed.
Figure 3:
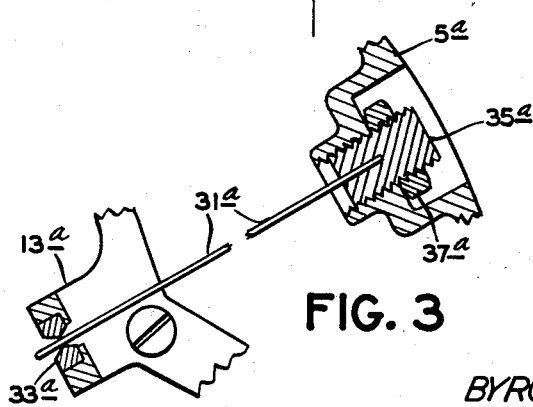
Fig. 3 is a detail of another embodiment of the novel spring mechanism for opposing precession of the gyroscope.

The embodiment shown in Fig. 3 operates in substantially the same manner as the embodiment in Figs. 1 and 2 except that jewel bearing 33a is fixed to bracket 13a and slidingly receives one end of rod-like element 31a, the other end of the rod-like element being seated in a block 35a threaded in frame 5a for adjusting the effective length of element 31a. A lock nut 37a is provided to prevent movement of block 35a after adjustment.

The centering arrangement embodied in the angular rate gyroscope shown and described herein is positive in its action in returning the rotor support to neutral position. It is cheap and simple to manufacture and may readily be adjusted to vary the sensitivity of the gyroscope. Also, the centering arrangement provides for substantially linear precession of the gyroscope from neutral position.

Although but two embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. An angular rate gyroscope comprising a frame member, a rotor support member mounted for oscillation in said frame member, and means yieldingly opposing precession of the support member in either direction from its neutral position, said means comprising a cantilever spring element connected to said members and having a free portion extending through the precession axis of said rotor support member.

2. An angular rate gyroscope comprising a rotor support member, a frame member, means supporting said rotor support member for oscillation in said frame member, and means yieldingly opposing precession of the support member in either direction from its neutral position, said last-mentioned means comprising a rod-like spring element fixed to one of said members and axially slidable relative to the other of said members, arranged to flex when said rotor support member precesses from its neutral position and to exert angular force on said rotor support member to return it to its neutral position.

3. An angular rate gyroscope comprising a frame member, a rotor support member mounted for oscillation in said frame member, and means yieldingly opposing precession of the support member in either direction from its neutral position, said means comprising a rod-like spring element, one end of said rod-like spring element being attached to one of said members, and a bearing mounted on the other of said members slidably receiving the other end of said spring element, said element being arranged to flex when said rotor support member precesses from its neutral position and to exert angular force on said rotor support member to return it to its neutral position.

4. An angular rate gyroscope as described in claim 3 including means for adjusting the distance between the point of attachment of the rod-like spring element and the bearing to change the effective length of the rod-like element.

5. An angular rate gyroscope as described in claim 3 in which the rod-like spring element extends through the precession axis of said rotor support member.

6. An angular rate gyroscope comprising a rotor support, a frame, means supporting said rotor support for oscillation in said frame, and means yieldingly opposing precession of said support in either direction from its neutral position, said last-mentioned means comprising a rod-like spring element attached at one end to said rotor support, a bearing attached to said frame and slidably receiving the other end of said rod-like element, said rod-like element being arranged to flex when said rotor support precesses from its neutral position and to exert angular force on said rotor support to return it to its neutral position.

7. An angular rate gyroscope as described in claim 6 in which the bearing includes a member threaded to the frame and adjustable axially of the rod-like element to vary the effective length of the rod-like element.

8. An angular rate gyroscope comprising a rotor support, a frame, means supporting said rotor support for oscillation in said frame, and means yieldingly opposing precession of said support in either direction from its neutral position, said last-mentioned means comprising a rod-like spring element attached at one end to said frame, a bearing attached to said rotor support and slidably receiving the other end of said rod-like element, said rod-like element being arranged to flex when said rotor support precesses from its neutral position and to exert angular force on said rotor support to return it to its neutral position.

9. In a device of the class described, a frame member, a rotor support member mounted for oscillation in said frame member, an indicator drivably connected to said rotor support member, and means yieldingly opposing precession of said support member in either direction from its neutral position, said means comprising a rod-like spring element fixed to one of said members and axially slidable relative to the other of said members, arranged to exert an angular force on said rotor support member when said rotor support member precesses to return it to its neutral position.

10. An angular rate gyroscope comprising a rotor support member, a frame member, means supporting said rotor support for rotation in said frame member, and means yieldingly opposing such rotation, comprising an elongated cantilever spring element extending through the precession axis of said rotor support member, a first element support mounted on one member, engaging a portion of the spring element at one side of said axis, and a second element support mounted on the other member and engaging a spaced portion of the spring element at the opposite side of said axis, one of said supports having a fixed engagement and the other support having a sliding engagement with said element, one of said supports being adjustable axially of the spring member, arranged to vary the distance between the points of engagement between the spring element and the supports, said spring element being arranged to flex when said rotor support precesses from its neutral position and to exert angular force on said rotor to return it to its neutral position.

11. An angular rate gyroscope as claimed in claim 10, in which the spring element is circular in cross-section, and the axially adjustable member is threaded in the associated member.

References Cited in the file of this patent

UNITED STATES PATENTS

| 1,407,491 | Sperry | Feb. 21, 1922 |
| 1,778,734 | Sperry | Oct. 21, 1930 |
| 2,199,290 | Moss | Apr. 30, 1940 |
| 2,409,178 | Allison et al. | Oct. 15, 1946 |
| 2,563,983 | Watson | Aug. 14, 1951 |
| 2,569,676 | Kenyon | Oct. 2, 1951 |
| 2,585,146 | Maiorany | Feb. 12, 1952 |
| 2,672,054 | Warren et al. | Mar. 16, 1954 |
| 2,690,014 | Draper | Sept. 28, 1954 |